Nov. 21, 1939.   T. CHECKOS   2,180,754
COMBINED LICENSE PLATE HOLDER AND ILLUMINATOR
Filed Nov. 6, 1937
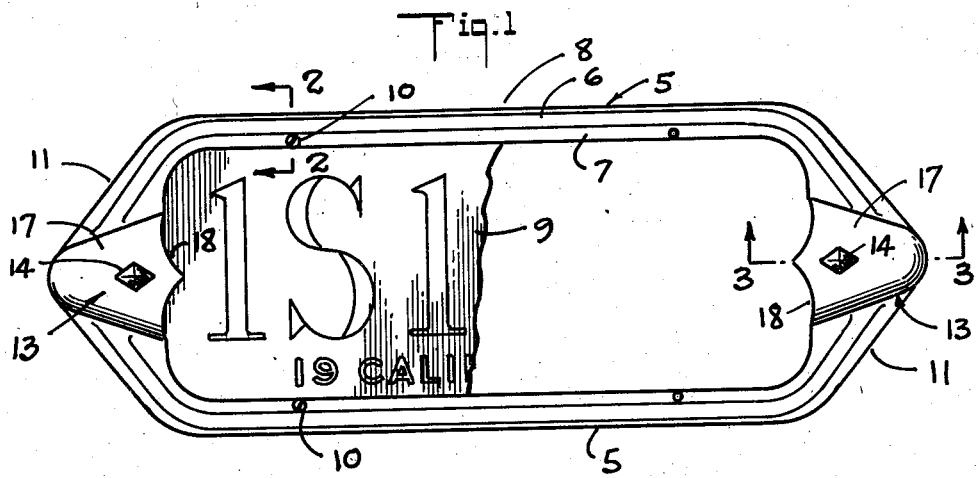
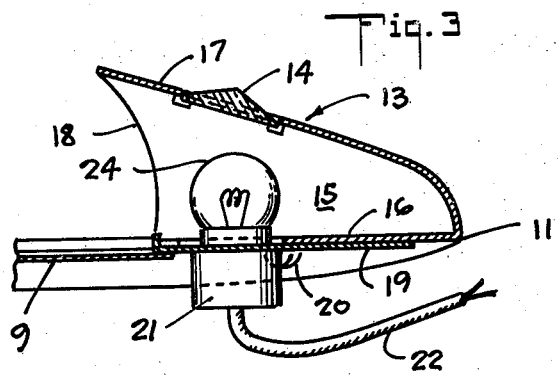
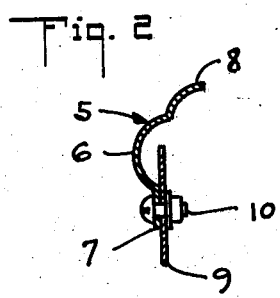
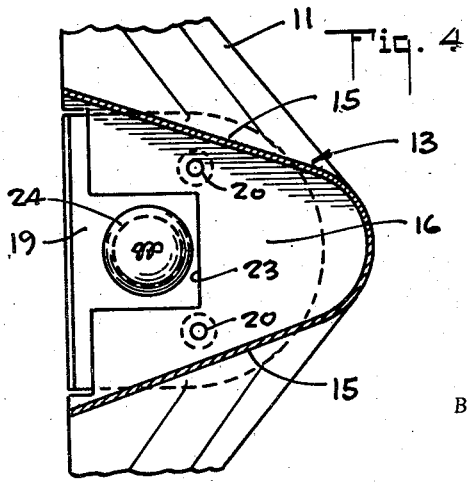
INVENTOR.
THEODORE CHECKOS
BY Joseph F. Westall
ATTORNEY.

Patented Nov. 21, 1939

2,180,754

UNITED STATES PATENT OFFICE 2,180,754

COMBINED LICENSE PLATE HOLDER AND ILLUMINATOR

Theodore Checkos, Los Angeles, Calif.

Application November 6, 1937, Serial No. 173,225

5 Claims. (Cl. 40—130)

This invention relates to holders of the class adapted for the support of license plates of motor vehicles, and particularly contemplates the provision of means for illuminating the license plate carried thereby.

The illumination of license plates carried at the rear of motor vehicles, in accordance with the teachings of the art prior to my invention, is in most instances effected by securing the license plate above or below the conventional tail light of the automobile. The tail light is provided with a window in its rim through which light may be emitted and deflected across the face of the license plate. This method not only reduces the efficacy of the tail light, but seldom affords sufficient light for easy reading of the license plate due to the small contour of such conventional lighting fixtures with respect to elongated nature of the license plate. It is necessary in such prior devices for the tail light to overhang the license plate without covering any portion of it. As the rearward side of the tail light must be transparent and clearly visible from the rear, the use of a reflector to throw the light downwardly and forwardly against the license plate is largely obviated. Accordingly, most of the rays from the tail light which pass through the window in its rim for illuminating the license plate pass over the plate without being reflected by it.

License plates at the front of motor vehicles are seldom illuminated and are particularly difficult to read because of the glare of the usual headlights.

It is a principal object of the present invention to provide a frame in which a license plate may be secured having integral therewith and at opposite ends thereof lighting fixtures, each comprising a hood reflector to protect the light bulb carried therein and to deflect light onto a license plate carried between said reflectors.

Another object of my invention is the provision of a device of the character indicated adaptable for attachment to conventional type front or rear automobile license-plate supporting brackets and which embodies economy of manufacture, durability in use, ease of installation, and attractive appearance.

Another object is to provide a hood for a light bulb at each end of a holder having diverging sides so as to spread the light from the bulb across the width of the plate in combination with the dome-shaped top diverging upwardly from the plane of the license plate so as to deflect light with equal intensity from the side edge of the plate to the middle thereof.

Another object of my invention is the provision of a light hood of the character above indicated having a window therein, preferably of red glass, whereby the lighting expedient in the hood may supplant the usual tail light of an automobile.

Other objects and salient features will be apparent to those of skill in the art to which my invention appertains from an examination of the following description read in the light of the accompanying drawing, in which:

Fig. 1 is a front elevation of my invention depicting a license plate, partially broken away, operatively disposed therewith;

Figs. 2 and 3 are sectional views taken on correspondingly numbered lines of Fig. 1;

Fig. 4 is a broken plan view showing one of the hoods of the lighting fixture of my invention in section.

Referring to the drawing in detail, the numerals of which indicate similar parts throughout the several views, 5 designates each of the opposite sides of a frame having an ornamental cross-sectional contour as shown in Fig. 2 comprising a semi-circular curved section 6 flanked by an inner flat strip 7 and an outer roll 8. The license plate, generally indicated by the numeral 9, is bolted at its edges to the sides of the frame or may be secured in any other well known manner. The bolts 10 at either side of the frame may be employed to hold the same to the conventional license-plate bracket mounted on the body of a motor vehicle.

The ends 11 of the frame are formed of extensions 12 the sides of which are turned obliquely inwardly from opposite sides. The flat portion 7 of the extensions 12 are widened toward the middle of the end portions to form inner edges of the opposite ends of the frame, substantially parallel with respect to each other. At each end of the frame is a hood 13 comprising a dome-shaped member having sides 15 diverging in the direction of the inside of the frame and extending upwardly from a hood floor 16, with which it is integral. The floor 16 is also formed integrally with end extensions of the frame. A roof 17 of the dome extends obliquely upwardly from the floor 16 adjacent the outer edge of the frame and spreads with the diverging sides. The inner unattached edge of each dome may be formed in any configuration desired as, for example, that shown in Fig. 1, as designated by the numeral 18.

In the roof 17 of each light hood 13 an opening is formed in which a red glass window 14 is secured in any manner well known in the art. It will be obvious that such windows may be of other than red glass; that they may be elongated, so as to extend to the narrow end of the hood and throw a beam of light in a direction parallel to the frame; that different colored windows may be employed in each hood; and that the hoods may be entirely opaque if desired.

To the underside of the front of each hood 13 a plate 19 is secured, preferably by means of screws 20. A conventional type light bulb socket 21 is mounted to the underside of plate 19 and is connected to a source of electricity by wire 22. The inner edge of floor 16 of the hood is recessed as at 23 through which a light bulb 24 is inserted for threading into socket 21.

It will be apparent that in a modified construction, the light hood may be pressed from the ends of the frame, and the plate 19 bolted to the frame at opposite sides of the hood; that the frame may be made in two sections and slidably connected for its adaptation to plates of any size; that numerous changes may be made in size, design, proportion and number of the various parts without departing from the spirit of my invention as defined by the appended claims.

What I claim and desire to secure by Letters Patent is:

1. In a device of the character described, an elongated frame comprising a strip of metal forming two parallel sides of said frame and end portions shorter than said sides, a pair of hoods overhanging the area inclosed by said frame, said hoods each comprising a pair of diverging sides extending upwardly from said end portions respectively, a dome connected to said sides of each hood and diverging upwardly from the end portion to which the respective hoods are attached in the direction of the area inclosed by said frame, and lighting means under said hoods.

2. In a device of the character described, an elongated frame comprising a strip of metal forming two parallel sides and two end portions shorter than said sides, the portions of said strip forming said sides having in cross section an inner flat portion and an outer curved flange, the flat portion of one of said sides being perforated for attachment to supporting means, the sides of said frame presenting an unobstructed surface of uniform contour, a hood on each end portion of said frame, said end portions forming the floor of said hood, and illuminating means extending through the floor in each of said hoods.

3. In a device of the character described, a substantially rectangular frame comprising two sides and two ends shorter than said sides, a hood reflector on each of said ends, the ends of said frame forming the floors of said reflector hoods, respectively, said hood reflectors each comprising a roof diverging upwardly from said floor, diverging sides connecting the edges of said roof to said floor, said floors each having an opening therein, a light socket connected to each of said floors and extending through said respective openings in horizontal alignment with each other and the longitudinal axis of said frame, illuminating means in each of said light sockets to illuminate uniformly a plate carried by said frame between said hood reflectors.

4. In a device of the character described, an elongated frame comprising a strip of metal forming two parallel sides and two end portions shorter than said sides, the portions of said strip forming said sides having in cross-section an inner flat portion and an outer curved flange, the flat portion of one of said sides being perforated for attachment to supporting means, the sides of said frame presenting an unobstructed surface of uniform contour, a hood on each end portion of said frame, said end portions forming the floors of said hoods respectively and each having an opening therethrough, a plate secured to the underside of each end portion having a hole therethrough registering with the openings in said end portions, respectively, and illuminating means secured to each of said plates and extending through said openings in said end portions, respectively.

5. In a device of the character described, an elongated frame comprising a strip of metal forming two parallel sides and two end portions shorter than said sides, the portions of said strip forming said sides having in cross-section an inner flat portion and an outer curved flange, the flat portion of one of said sides being perforated for attachment to supporting means, the sides of said frame presenting an unobstructed surface of uniform contour, hoods on opposite end portions of said frame, said end portions forming the floors of said hoods, respectively, and each having an opening therethrough, a plate secured to the underside of each end portion having a hole therethrough registering with the openings in said end portions, respectively, and illuminating means secured to each of said plates and extending through said openings in said end portions, respectively, said illuminating means being aligned with each other and the longitudinal axis of said frame to direct light against the ends of said plate and to a diminishing degree toward the center of said plate whereby the light reflected by all portions of said plate will be of uniform intensity.

THEODORE CHECKOS.